United States Patent
Schütz et al.

(10) Patent No.: US 12,543,746 B2
(45) Date of Patent: Feb. 10, 2026

(54) COMPONENT, IN PARTICULAR A TOP PLATE AND/OR A BURNER CAP OF A GAS HOB HAVING A NON-STICK AND/OR NON-WETTING COATING, GAS HOB COMPRISING SUCH A COMPONENT AND METHOD FOR MANUFACTURING A COMPONENT

(71) Applicant: ELECTROLUX APPLIANCES AKTIEBOLAG, Stockholm (SE)

(72) Inventors: Tobias Schütz, Rothenburg ob der Tauber (DE); Klaus Wälzlein, Rothenburg ob der Tauber (DE); Filippo Tisselli, Forli (IT)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 771 days.

(21) Appl. No.: 17/776,877

(22) PCT Filed: Sep. 29, 2020

(86) PCT No.: PCT/EP2020/077239
§ 371 (c)(1),
(2) Date: May 13, 2022

(87) PCT Pub. No.: WO2021/094031
PCT Pub. Date: May 20, 2021

(65) Prior Publication Data
US 2023/0358410 A1    Nov. 9, 2023

(30) Foreign Application Priority Data
Nov. 15, 2019  (EP) ..................................... 19209417

(51) Int. Cl.
*A21B 3/13*         (2006.01)
*C23C 18/12*        (2006.01)
(Continued)

(52) U.S. Cl.
CPC .............. *A21B 3/13* (2013.01); *C23C 18/122* (2013.01); *C23C 18/1225* (2013.01);
(Continued)

(58) Field of Classification Search
CPC .................................... B05D 3/14; B05D 5/06
See application file for complete search history.

(56) References Cited

U.S. PATENT DOCUMENTS 5,513,562 A * 5/1996 Moor ...................... A47J 19/06
                                                 15/236.08
6,656,425 B1    12/2003 Benthien
(Continued)

FOREIGN PATENT DOCUMENTS

CA     2171315      3/1995
CN    204427604     7/2015
(Continued)

OTHER PUBLICATIONS

International Search Report and Written Opinion for PCT/EP2020/077238, dated Nov. 27, 2020, 12 pages.
(Continued)

*Primary Examiner* — Hai Y Zhang
(74) *Attorney, Agent, or Firm* — Chrisman Gallo Tochtrop LLC (57) ABSTRACT

The present invention relates to component, in particular a top plate (2) for a gas hob (1) and/or a burner cap (6a, 6b) of a gas burner (5a, 5b) for a gas hob (1), having a non-stick and/or non-wetting coating (12) obtainable by a process characterised by the following steps, a) providing a component, in particular a top plate (2) and/or a burner cap (6a, 6b), having an upper surface (7a) and a bottom surface (11b), b) preferably, pretreating of at least the upper surface of the component, in particular the top plate or the burner cap, for providing a surface having a roughness being suitable for
(Continued)

applying a non-stick and/or non-wetting coating, by mechanical treatment, physical treatment or chemical treatment, in particular by sand-blasting and/or laser treatment and/or a surface activation treatment, particularly a plasma treatment, and/or an enameling process to form a ground layer (13), thus applying an enamel layer onto the upper surface of the component, in particular the top plate or the burner cap, c) applying the non-stick and/or non-wetting coating (12) to the upper surface (11a) of the component, in particular a top plate (2) and/or a burner cap (6a, 6b), or the surface (14a) of the ground layer (13), wherein the non-stick and/or non-wetting coating (12) comprises at least one layer (17) that is obtained by a sol-gel process from a first composition comprising a silica sol and a silane. The invention further relates to a cooking appliance (1), in particular a gas hob comprising such a component, in particular a top plate (2) and/or a burner cap (6a, 6b), and a method for manufacturing such a component, in particular a top plate (2) and/or a burner cap (6a, 6b).

19 Claims, 2 Drawing Sheets

(51) Int. Cl.
    *C23C 28/00*     (2006.01)
    *F24C 15/00*     (2006.01)
    *F24C 15/12*     (2006.01)
    *C23D 5/04*     (2006.01)

(52) U.S. Cl.
    CPC .......... *C23C 28/321* (2013.01); *C23C 28/345* (2013.01); *F24C 15/005* (2013.01); *F24C 15/12* (2013.01); *C23C 18/1254* (2013.01); *C23D 5/04* (2013.01)

(56) References Cited

U.S. PATENT DOCUMENTS

| | | | |
|---|---|---|---|
| 7,488,415 B2 | 2/2009 | Hui et al. | |
| 8,778,455 B2 | 7/2014 | Benford, Jr. et al. | |
| 9,074,778 B2 | 7/2015 | Nall et al. | |
| 9,151,504 B2 | 10/2015 | Lee et al. | |
| 2004/0105985 A1 | 6/2004 | Henze | |
| 2006/0182929 A1 | 8/2006 | Joerdens | |
| 2008/0032122 A1* | 2/2008 | Berrux | B05D 5/08 428/335 |
| 2014/0238379 A1 | 8/2014 | Venkataramani et al. | |
| 2015/0144613 A1 | 5/2015 | Guillemot et al. | |
| 2015/0175814 A1 | 6/2015 | Aizenberg et al. | |
| 2015/0219312 A1 | 8/2015 | Llaluet et al. | |
| 2015/0260412 A1* | 9/2015 | Nall | F24C 15/10 427/269 |
| 2018/0073741 A1 | 3/2018 | Kim et al. | |
| 2018/0360263 A1 | 12/2018 | Ebbeke | |

FOREIGN PATENT DOCUMENTS

| | | |
|---|---|---|
| EP | 0565941 | 10/1993 |
| EP | 1757863 | 2/2007 |
| EP | 1767668 | 3/2007 |
| EP | 2177580 | 4/2010 |
| EP | 3293457 | 3/2018 |
| EP | 3399240 | 11/2018 |
| EP | 3428539 | 1/2019 |
| FR | 3025995 | 3/2016 |
| GB | 718132 | 11/1954 |
| GB | 1418842 | 12/1975 |
| JP | S61076828 | 4/1986 |
| JP | H0523253 | 2/1993 |
| JP | 2014148704 | 8/2014 |
| WO | 0059555 | 10/2000 |
| WO | 0202471 | 1/2002 |
| WO | 2004087223 | 10/2004 |
| WO | 2011056742 | 5/2011 |
| WO | 2012040605 | 3/2012 |
| WO | 2012085786 | 6/2012 |

OTHER PUBLICATIONS

International Search Report and Written Opinion for PCT/EP2020/077245, dated Feb. 3, 2021, 12 pages.
Supplemental European Search Report for application No. EP 20787420, dated Dec. 15, 2022, 11 pages.
International Search Report and Written Opinion for PCT/EP2020/077239, dated Feb. 3, 2021, 12 pages.
European Communication in related application No. 19168020.6 dated Nov. 29, 2024, 14 pages.
EP2177580 English translation from US examiner.

* cited by examiner

COMPONENT, IN PARTICULAR A TOP PLATE AND/OR A BURNER CAP OF A GAS HOB HAVING A NON-STICK AND/OR NON-WETTING COATING, GAS HOB COMPRISING SUCH A COMPONENT AND METHOD FOR MANUFACTURING A COMPONENT

This application claims priority benefit to European patent application No. EP19209417.5, filed on Nov. 15, 2019, and International patent application No. PCT/CN2020/083446, filed on Apr. 7, 3 2020, the disclosures of which are hereby incorporated by reference herein in their entirety.

TECHNICAL FIELD

The present invention relates to a component, in particular a is top plate of a gas hob and/or a burner cap of a gas burner for a gas hob, having a non-stick and/or non-wetting coating. Further, the present invention relates to a cooking appliance, in particular a gas hob having such a component. Moreover, the present invention relates to a method for manufacturing a component, in particular a top plate of a gas hob and/or a burner cap of a gas burner for a gas hob top plate, wherein the non-stick and/or non-wetting coating is applied to the component.

BACKGROUND

One problem for the customer is the cleaning of components of a gas hob, such as a top plate of a gas hob or the burner cap of a gas burner gas hob after usage, especially after food items, such as cheese, sauces, oils, fat or the like, splashing out from a pan or pot and that are burned onto the surface of the component. Therefore, there are different approaches on the market to make cleaning easier, for example top plates that are coated with an enamel that is more easy to clean and less sensitive to impacts and scratches than stainless steel.

One disadvantage of said coatings is that they are usually applied in two steps and high burning temperatures are required during its manufacturing process, which causes high costs and effort. In a first step a first layer of an enamel coating, e.g. a granite enamel, for providing good adhesion properties and having a dark colour is applied to the top plate. In a second step, a second layer having a light colour is applied to the first layer. Afterwards, the coating has to fired at high burning temperatures of over 800° C. Furthermore, the cleanability of such surfaces needs to be improved.

SUMMARY

It is an object of the present invention to provide component, in particular a top plate of a gas hob and/or a burner cap of a gas burner for a gas hob, a cooking appliance comprising such component and a method for manufacturing such a component, having improved properties, in particular with regard to cleaning behaviour.

A Component, in particular a top plate of a gas hob and/or a burner cap of a gas burner for a gas hob, having a non-stick and/or non-wetting coating on a surface is obtainable by (or: prepared by) a process characterised by the following steps:
a) providing the uncoated component, in particular the top plate or the burner cap, in particular a plate-shaped top plate, having an upper surface and a bottom surface,
b) preferably, pretreating of at least the upper surface of the component, in particular the top plate or the burner cap, for providing a surface having a roughness being suitable for applying a non-stick and/or non-wetting coating, by mechanical treatment, physical treatment or chemical treatment, in particular by sandblasting and/or laser treatment and/or a surface activation treatment, particularly a plasma treatment, and/or an enameling process to form a ground layer (13), thus applying an enamel layer onto the upper surface of the component, in particular the top plate or the burner cap,
c) applying the non-stick and/or non-wetting coating, directly or indirectly, to the pretreated upper surface of the component, in particular the top plate or the burner cap, wherein the non-stick and/or non-wetting coating comprises at least one layer that is obtained by a sol-gel process from a first composition comprising a silica sol and a silane.

In other words: The non-stick and/or non-wetting coating is a sol-gel coating. The at least one layer, hereinafter also referred to as base layer, is composed of a matrix comprising the condensation reaction product of a silica sol and a silane. Obtained by a sol-gel process from a first composition has therefore to be understood in such a way, that the first layer is obtained by means of hydrolysis and (poly-)condensation of an aqueous mixture comprising at least a silica sol and a silane. Thus, the starting materials of the first composition, namely at least silica sol, silane and water if needed, are mixed together and stirred. The mixture obtained thereof is then applied to the upper surface of the component and dried to obtain the first layer. Such a coating having one layer is known for example from EP 2 177 580 B1.

The expression "non-stick" indicates a surface that resists adherence of food items, such as cheese, sauces, oils, fat or the like, what permits easy cleaning of the component, in particular the top plate or the burner cap. The expression "non-wetting" terms a surface that repels liquids, e.g. water. The property is evidenced by a large contact angle between a drop of water and the surface on which the drop rests, wherein a contact angle of at least 95 degree is desirable.

According to the present invention, however, the "upper surface" of component, in particular the top plate or the burner cap, is the surface directed to the user and/or providing or surrounding the cooking areas of the gas hob. Accordingly, a "bottom surface" of the component, in particular the top plate or the burner cap, is the surface facing away from the user and said cooking areas. For reasons of clarity, we mainly refer to top plates in the following but the explanations apply in the same way to other components of a gas hob.

The idea of the present invention is to provide a component with an easy to clean effect whereby the contact angle of the surface shows more than 95 degrees. Applying a non-stick and non-wetting coating by a sol-gel process has the advantage that a burning process at high temperatures for applying a non-stick coating on the component is not required what saves energy. Besides a good cleaning behaviour, said coating shows good abrasion-resistant and a great surface hardness what leads to an increased lifetime.

The adhesion of the non-stick and/or non-wetting coating to the pretreated surface of the component may particularly depend on the surface roughness. The present inventors have surprisingly found that such pretreatment of the surface before applying the non-stick and/or non-wetting coating and particularly a roughening of the surface is advantageous for the adhesion properties of the non-stick and/or non-wetting coating. Without such pretreatment, particularly such roughening, the at least one layer, and any subsequent layer, of the non-stick and/or non-wetting coating may peel off. Therefore an advantageous surface structure may reduce the risk of peel off of the non-stick and/or non-wetting coating and at the same time allow to reduce the amount of coating and thus decrease costs. However, a surface roughness, which is too high, may also be disadvantageous, as the adhesion of the coating may be not optimal and/or the amount of coating needed will be higher than necessary.

A pretreatment of the surface by laser may be particularly advantages in comparison to known sandblasting methods in that integration into other production equipment is possible, for example related to existing laser welding lines, where sandblasting equipment may need totally new equipment and specific housings, protections, or the like. Furthermore it is also advantageous in having no need of process material, like corundum powder usually applied in sandblasting. Furthermore, it is also advantageous in reducing dirt occurring during the treatment and further surface cleaning after pretreatment steps and/or before coating is advantageously reduced compared to standard sandblasting methods. Also reproducibility of surface parameter values are advantageously increased.

The person skilled in the art will recognize that various laser methods and laser equipment may be applied to achieve the described preferably surface roughness. By way of example, in a pretreatment step according to the present invention a laser of type CL100 can be applied with a focal width of 254 mm, a wave length of 1064 nm, and an optical system STAMP10 with suction removal. Thereby, the surface treatment speed may be adjusted according to the desired results and with methods well known to the person skilled in the art. For example such surface treatment speed may be approximately 10 $m^2$/sec or higher.

According to the invention, the surface of the component might be roughened and/or protected against corrosion by applying a ground layer by an enameling process, thus by applying an enamel layer, to the surface. The enameling process in particular comprises applying an enamel powder onto the upper surface of the component and heating the enamel powder for providing a ground layer with a surface having a roughness being suitable for applying the non-stick and/or non-wetting coating and/or being corrosion resistant.

Such a ground layer is useful for all base materials in order to prepare the component for subsequent coating, thus for providing a good wettability and clean surface to obtain good adhesion performances on the full surface and no detachment of the non-stick and/or non-wetting coating.

Furthermore, said ground layer may provide corrosion resistance for the surface of the component so that it also functions as a protective layer, in case of a component made of a non-corrosive material itself. Therefore roughening the upper surface of the component by an enameling process is advantageous with regard to mechanical treatment like sandblasting or by laser treatment as just one single process step has to be carried out in order to form a surface that has a good roughness and is in particular additionally non-corrosive in comparison to apply a protective layer in a first step and to roughen the surface of the protective layer in a second step.

The component can be made of different materials, the material being suitable for intended use, such as stainless steel or another material that is non-corrosive itself, for example aluminium or an aluminium alloy, or made of glass, in particular a tempered glass, or made of glass ceramics. The disadvantage of components made from stainless steel is, however, that they are expensive. Therefore, in a preferred alternative, the component is made of corrosive steel, particularly so-called low-carbon steel is a preferred material for the component. An example for such commonly used low carbon steel typically contains a small percentage of carbon, approximately about 0.05 to 0.30% carbon.

In case of a component made of corrosive material, the component is preferably provided with (or: comprises) a protective layer (or: non-corrosive layer) that is applied to at least the upper surface of the component and wherein said protective layer is pretreated by sandblasting and/or laser treatment and/or an enameling process, thus applying an enamel layer for providing a surface having a roughness being suitable for applying the non-stick and/or non-wetting coating and applying the at least one layer of the non-stick and/or non-wetting coating is applied to said protective layer. For example, the surface of the component is coated with such a protective layer by spray-painting.

This is due to the reason, that the non-stick and/or non-wetting coating itself does not protect the base material or substrate, thus the component, from corrosion. Therefore, an additional corrosion protection layer is advantageous if the component is made of any corrosive material so that the non-stick and/or non-wetting coating can also be used with base material or substrate that is corrosive itself. In case the base material is non-corrosive itself, thus the component is manufactured from stainless steel or another non-corrosive material, the step of applying a protective layer for corrosion protection may be optional.

According to preferred embodiments, said protective layer is an enamel layer and/or an aluminium layer and/or a layer comprising aluminium.

Preferably the protective layer has a thickness between 50 and 250 µm, in particular between 100 and 200 µm.

The protective layer and/or the ground layer might be made of a so-called pyro or vitreous enamel that essentially consists of melted and fused glass powder. For applying said enamel layer to the component, high burning temperatures from about 820 to 840° C. are needed.

Another kind of protective layer and/or ground layer might be made of an enamel having a low softening point between 450° C. and 560° C., respectively a low glass transition temperature, a so-called "low-temperature enamel". The softening point is defined as a temperature, respectively a temperature range, at which the material, e.g. the enamel turns from its hard and relatively brittle state into a molten or rubber-like state when temperature is increased. Therefore, said low-temperature enamel can be applied to the surface of the component at lower burning temperatures. Said enamel is for example an aluminium enamel that comprises aluminium oxide.

Compositions of such conventional enamels are known for example from WO 02/02471 A1 or GB 718,132. WO 02/02471 A1 discloses an enamel composition for use in forming an enamel cover coat comprising a glass component comprising at least a first glass frit, comprising by weight from about 30% to about 45% $P_2O_5$, from about 20% to about 40% $Al_2O_3$ from about 15% to about 35% $Li_2O$ and $Na_2O$ and $K_2O$, up to about 15% $B_2O_3$, up to about 15% MgO and CaO and SrO and BaO and ZnO, up to about 10% $TiO_2$ and $ZrO_2$, and up to about 10% $SiO_2$. The glass component may also comprise a blend of at least a first glass frit and a second glass frit. GB 718,132 discloses alkali metal aluminium phosphate vitreous enamel frits.

Another kind of protective layer and/or the ground layer might be made of a catalytic enamel, for example known from EP 0 565 941 A1, disclosing a catalytically active coating composition comprising an enamel frit, e.g. containing $SiO_2$, $B_2O_3$, $TiO_2$, $ZrO_2$, $P_2O_5$, $Fe_2O_3$, $Al_2O_3$, alkali metal oxides and alkaline earth metal oxides. The coating further comprises inert substances such as, for example, quartz, feldspar or alumina are used and an oxidation catalyst. Another catalytic enamel is known for example from GB 1 418 842 disclosing a catalytically active enamel layer for a cooking appliances, wherein an oxide and/or mixed oxide of natural origin containing iron oxide and/or titanium oxide is added to an enamel frit containing typical silicates and oxides.

Furthermore, so-called ground coat compositions comprising generally a glassy component and an additive component might be used for forming the protective layer and/or the ground layer providing the effect of a rough and binding surface. Such ground coats are for example described in U.S. Pat. No. 8,778,455 B2 and comprise a combination of one or more alkali oxides, such as $Na_2O$ or $Ka_2O$, one or more alkaline earth oxides, such as ZnO or BaO, and one or more various transition metal oxides, such as $Al_2O_3$, $SiO_2$, $TiO_2$, $ZrO_2$, $P_2O_5$ or $Co_2O_3$, as glassy component, and additive such as fluorine or $NO_2$.

According to a preferred embodiment, the ground layer, in particular the enamel layer obtainable by the enameling process, has a layer thickness between 5 and 100 μm, in particular between 10 and 80 μm, more particularly between 20 and 50 μm. Typical enamel thickness is normally larger than 100 μm. Inventors have surprisingly found, that the enamel compositions mentioned above allow forming of thinner layers that give a favorable rough surface.

For providing good adhesion properties of the non-stick and/or non-wetting coating, the surface is pretreated to provide a surface of the component that has roughness being suitable for applying the non-stick and/or non-wetting coating. In a preferred embodiment a surface roughness of a surface of the component and/or a surface of the ground layer and/or a surface of the protective layer achieved with such pretreatment step is between Ra 0.01 μm to 10.00 μm, more preferably between Ra 0.10 μm to 5.00 μm, still more preferably between Ra 0.20 μm to 5.00 μm, still more preferably between Ra 0.50 μm to 5.00 μm, still more preferably between Ra 2.00 μm to 5.00 μm, still more preferably between Ra 2.50 μm to 5.00 μm.

The present inventors have surprisingly found that such an advantageous roughness within the above limits further improves the adhesion of subsequent layers or of a first or any subsequent layers of the non-stick and/or non-wetting coating to the component or the protective layer and/or the ground layer to reduce the risk of peel off of the coating and at the same time reduce costs as the amount of coating is reduced in a favorite manner.

In summary, a surface having such a good roughness can be obtained in particular by applying a ground layer of known enamels as mentioned before. Even mechanical, physical or chemical treatment, in particular laser treatment of the surface can be carried out to achieve required roughness.

A lower surface roughness—within the limits above mentioned—may be advantageous as the amount of non-stick and/or non-wetting coating can be reduced.

Preferably, a surface roughness is less than Ra 10.00 μm, preferably less than Ra 7.50 μm, more preferably less then Ra 5.00 μm.

A higher surface roughness—within the limits mentioned above—may be advantageous as this would improve adhesive capacity for the non-stick and/or non-wetting coating.

Preferably, a surface roughness is more than Ra 0.01 μm, preferably more than Ra 0.10 μm, more preferably more than Ra 0.20 μm, still more preferably more than Ra 0.50 μm, still more preferably more than Ra 1.00 μm, still more preferably more than Ra 2.00 μm.

The person skilled in the art knows various standard methods to determine the surface roughness value Ra. Particularly the surface roughness may be preferably determined in accordance with BS EN ISO 4287:2000 British standard, identical with the ISO 4287:1997 standard.

In a preferred embodiment, the ceramic non-stick and/or non-wetting coating comprises at least a first and a second layer, wherein the first layer is applied to the pretreated upper surface of the component or the surface of the ground layer or the pretreated surface of the protective layer, and wherein the second layer is applied to the first layer, so that a component comprising a coating having base layer and top layer is obtained.

Particularly, the second layer is obtained by a sol-gel process from a second composition comprising a silica sol, a silane and a siloxane, in particular a polydimethylsiloxane. Such a coating having at least a second layer is also known from EP 2 177 580 B1.

In other words: The second layer, hereinafter also referred to as top layer, is composed of a matrix comprising the condensation reaction product of a silica sol, a silane and a siloxane. Obtained by a sol-gel process from a second composition has therefore to be understood in such a way, that the second layer is obtained by means of hydrolysis and (poly-)condensation of an aqueous mixture comprising at least a silica sol, a silane and a siloxane. Thus, the starting materials of the second composition, namely at least silica sol, silane, siloxane and water if needed, are mixed together and stirred. The mixture obtained thereof is then applied to the upper surface of the first layer and dried to obtain the second layer.

Preferably, the silica sol is present in an amount of 15 to 70 wt %, in particular in an amount of 30 to 70 wt % and/or the silane is present in an amount of 2 to 70 wt %, in particular in an amount of 10 to 40 wt %, both in the first and/or the second composition and/or in the first and/or second layer.

In particular the silane in the first and/or the second composition and/or in the first and/or second layer is an organoalkoxysilane, in particular a methyltrimethyoxysilane and/or a fluoralkoxysilane.

The first and/or the second composition and/or in the first and/or second layer may comprise a catalyst, in particular an acidic catalyst, more preferably an organic compound containing one or more carboxyl groups and/or a mineral acid, e.g. hydrochloric acid, sulfuric acid or nitric acid. Different monocarboxylic or dicarboxylic acids like formic acid, acetic acid or oxalic acid may be mentioned here as an example for suitable catalysts.

It has been shown, that it is advantageous, if the catalyst is present in an amount of 0.1 to 5 wt %, in particular in an amount of 0.1 to 2 wt %, both in the first and the second composition and/or in the first and/or second layer. The catalyst generally acts as a catalyst in the hydrolysis and condensation reaction and prevents too slow crosslinking.

In another preferred embodiment, the first and/or the second composition and/or in the first and/or second layer comprise or comprises a solvent, in particular an organic solvent. Examples for organic solvents are alcoholic solvents, for example methanol, ethanol or propanol.

In particular, the solvent is present in an amount of 10 to 60 wt %, in particular in an amount of 10 to 40 wt %.

Like the second composition or second layer, the first composition or first layer may also comprise a siloxane in a preferred embodiment. Said siloxane is in particular a polydimethylsiloxane.

An advantageous amount of siloxane in the first composition or first layer as well as in the second composition or second layer is between 0.1 to 2 wt %.

In a preferred embodiment, the first composition or first layer and/or the second composition or second layer comprise or comprises pigments and/or dyes and/or filling materials and/or further additives. In particular, temperature resistant anorganic pigments are favourable.

In addition, water is added to the first composition and/or the second composition, if needed.

Besides mechanical functionality and easy-to-clean behaviour, components of a gas hob, in particular a top plate may also be provided with specific printing for applying product name and/or symbols for a user interface that are touched by a user. Is is desirable to apply such printings without need of removal of the coating in the areas of the printing and without worsen the cleanability of the component. According to a preferred embodiment, the component comprises such a printing, wherein at least a part of an upper surface of the coating provides an activated surface area, in particular being activated by an activation process that increases the surface tension within the activated surface area compared to the remaining surface of the coating before the activation process or parts of the surface that are not activated. Said activation process is in particular activated by an activation process using plasma technology. The printing (or printing material) is then applied to the activated surface area, thus on those parts of the surface of the coating for or on which the activation process has been carried out. Application of the printing is in particular carried out by means of ink technology, such as serigraphy or tampography.

Thereby the component comprises a printing, but still shows good cleaning behaviour. Performing the preliminary activation process on the coating increases locally the surface tension so that the coating shows good adhesion properties in said activated areas for subsequent applying of the printing. Said activation lasts for some days, allowing a convenient application of symbols or the like, in particular by using traditional ink technologies. As the printing is applied to the coating without need of removing parts of said coating, e.g. by laser treatment before, additionally corrosion issues are avoided.

A preferred embodiment is characterized by an activation process which is performed using plasma technology. Particularly, a plasma technology gun or pin is used, moving on or above the part of the exposed surface of the coating to be treated and performing the activation process passing over said area. The coating is essentially non polar and shows non-wetting properties. Due to the activation process within the plasma, polar groups are formed at the exposed surface of the coating that increase the wettability of its surface. Subsequently, the printing can adhere to the surface.

In order to perform a quick and cost-efficient treatment, the activation process may be performed by limiting to the area or areas receiving a printing. Hence, areas without any printing may be excluded from such treatment. In order to reach this target, the exposed surface of the coating is covered at least partially, thus blank or non-printed areas are covered before performing the activation process in order to limit the part of the exposed surface on which the activation process is performed, in particular by covering parts of the exposed surface by means of respective cover elements or cover means. Alternatively, the plasma technology gun or pin may be deactivated when passing over the blank or non-printed areas.

Such a cooking appliance comprises a top plate comprising at least one cooking area and at least one gas burner for heating the at least one cooking area. The cooking appliance further comprises a top plate and/or a burner cap according to the present invention.

A cooking appliance or gas hob, respectively, according to invention may be embodied as different types gas hobs, including classic burners in a stainless steel or enameled steel hob, gas burners on a glass or glass ceramics as well as gas-glass-ceramic cooking hobs with gas-infrared radiators underneath a glass-ceramic.

The gas burner may have various designs that are well known for person skilled in the art, in general including a burner cap, a burner crown, a spark plug and a thermocouple.

The cooking appliance may comprise further components that are provided to be attached to the cooking appliance and/or the top plate, for example grate or pot carriers or a control panel.

Such a method for manufacturing a component, in particular a top plate or a burner cap having a non-stick and/or non-wetting coating on an upper surface comprises at least the following steps:

Firstly, an uncoated component, in particular a top plate, being in particular planar-shaped, and/or a burner cap each having an upper surface and a bottom surface is or are provided.

Secondly, at least the upper surface of the component, in particular a top plate or a burner cap is pretreated by mechanical treatment, physical treatment or chemical treatment, in particular by sandblasting and/or laser treatment and/or an enameling process to form a ground layer to provide a surface having a roughness being suitable for applying a non-stick and/or non-wetting coating.

In other words: Before applying the non-stick and/or non-wetting coating or—if useful—a protective layer to the component, in particular a top plate or a burner cap, the surface of the uncoated component, in particular a top plate or a burner cap is prepared, e.g. by cleaning and/or drying the upper surface and/or activating the upper surface, preferably by roughening the surface by sandblasting and/or laser treatment and/or an enameling process to form a ground layer on the upper surface, in order to achieve better adhesion of the protective layer or the non-stick and/or non-wetting coating.

Regarding the pretreatment and roughening of the surface, we explicitly refer to the explanations and examples described with regard to the different methods and materials used for the different layers, in particular the different enamel compositions, described in the context of the protective and/or ground layer as well as composition of the non-stick and/or non-wetting coating described in the context of the component, in particular a top plate or a burner cap.

Thirdly, at least one layer of the non-stick and/or non-wetting coating is applied to the pretreated upper surface of the component, in particular a top plate or a burner cap or the surface of the ground layer.

According to a preferred embodiment, during the enameling process of the pretreatment, an enamel powder is applied onto the upper surface of the component, in particular a top plate or a burner cap and the enamel powder is heated for providing a ground layer with an upper surface having a roughness being suitable for applying the non-stick and/or non-wetting coating.

According to a preferred embodiment, a protective layer, in particular an enamel layer and/or an aluminium layer and/or a layer comprising aluminium, is applied to at least the upper surface of the component, in particular a top plate or a burner cap and the surface of the protective layer is pretreated by sandblasting and/or laser treatment and/or an enameling process to form a ground layer.

In other words: Before applying the non-stick and/or non-wetting coating to the surface of the protective layer, the surface of the protective layer is prepared, e.g. by cleaning and/or drying the upper surface and/or activating the upper surface, preferably by roughening the surface for example by mechanical treatment, in particular sandblasting, laser treatment or chemical treatment of the upper surface of the component, in particular a top plate or a burner cap, in order to achieve better adhesion of the non-stick and/or non-wetting coating. Also preferred is even here, that the surface of the protective layer is made and/or roughened by an enameling process, in particular by applying a ground layer.

Thus the ground layer is applied to the upper surface of the component, in particular a top plate or a burner cap, by an enameling process having a surface roughness between Ra 0.01 µm to 10.00 µm, more preferably between Ra 0.10 µm to 5.00 µm, still more preferably between Ra 0.20 µm to 5.00 µm, still more preferably between Ra 0.50 µm to 5.00 µm, still more preferably between Ra 2.00 µm to 5.00 µm, still more preferably between Ra 2.50 µm to 5.00 µm and/or a layer thickness between 5 and 100 µm, in particular between 10 and 80 µm, more particularly between 20 and 50 µm. Said properties can be achieved by using enamel compositions described before, thus conventional enamels, catalytic enamels or so-called ground compositions. We refer explicitly to the explanations and examples described in the context of the protective and ground layer of the component, in particular a top plate or a burner cap.

In a preferred embodiment, the non-stick and/or non-wetting coating comprises a first and a second layer, wherein the first layer is applied to the upper surface of the component, in particular a top plate or a burner cap or the surface of the ground layer or the pretreated surface of the protective layer, and wherein the second layer is applied to the first layer, so that a top plate comprising a coating having base layer and top layer is obtained.

In order to apply a printing on the coated surface, according to a preferred embodiment, the method may comprise additionally the steps performing an activation process on at least a part of the surface of the coating in order to provide an activated surface area, wherein the activation process in particular increases the surface tension within the activated surface area, in particular performing an activation process by using plasma technology, and applying a printing to the activated surface area, in particular by means of ink technology.

Novel and inventive features of the present invention are set forth in the appended claims.

BRIEF DESCRIPTION OF THE DRAWINGS

The present invention will be described in further detail with reference to the drawings, in which.

DETAILED DESCRIPTION

Figure 1:
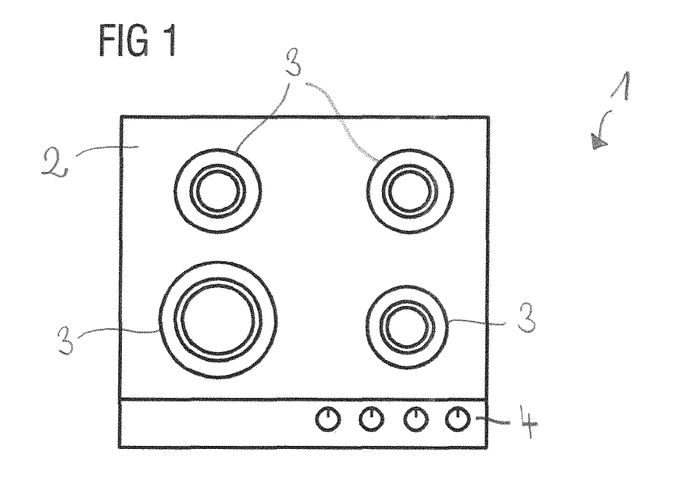
FIG. 1 illustrates a top view of a gas hob having a top plate according to an embodiment of the present invention.

FIG. 1 illustrates a top view of an embodiment of a gas hob 1. The gas hob 1 comprises a component, in fact a top plate 2 according to the present invention being plate-shaped and having exemplary four cooking areas 3 of different sizes on which pans or pots are to be placed for cooking foodstuff.

The gas hob 1 further comprises a control panel 4 with several operating and display elements, e.g. cooking level display or setting knobs. Furthermore, the gas hob may comprise grate or pot carriers (not shown) that can be placed on the top plate 2.

Figure 2A:
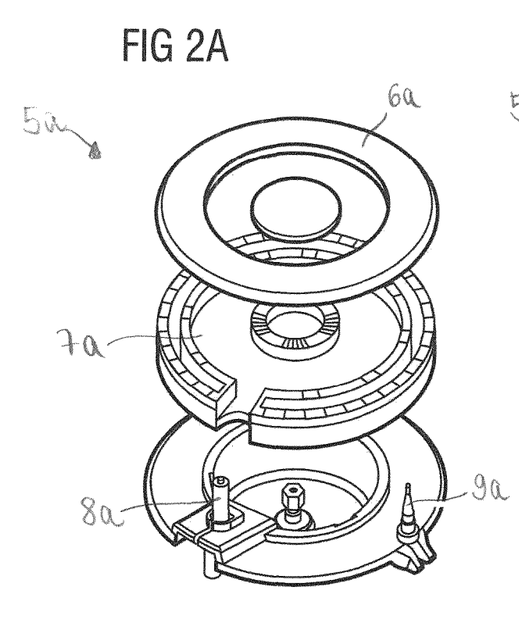
FIG. 2A illustrates a first embodiment of a gas burner having a burner cap.
Figure 2B:
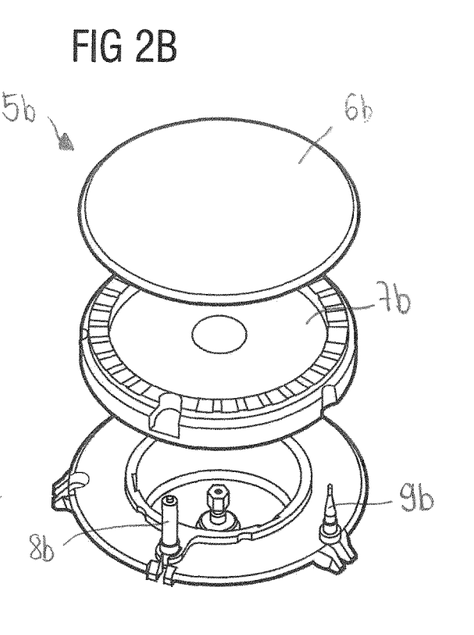
FIG. 2B illustrates a second embodiment of a gas burner having a burner cap.

The gas hob 1 further comprises gas burners 5a, 5b for heating the cooking areas. Two embodiments of such gas burners 5a, 5b are exemplarily shown in FIG. 2A and FIG. 2B. The gas burner 5a according to a first embodiment comprises a disc-shaped burner cap 6a being prepared and having a non-stick and/or non-wetting coating according to the present invention, a burner crown 7a, a spark plug 8a and a thermocouple 9a. The gas burner 5b according to a second embodiment comprises a ring-shaped burner cap 6b being prepared and having a non-stick and/or non-wetting coating according to the present invention, a burner crown 7b, a spark plug 8b and a thermocouple 9b.

The top plate 2 can be made of a corrosive material, in particular low-carbon steel, or glass or glass ceramics. The top plate 2 comprises an upper surface 11a, a bottom surface 11b and openings for inserting a gas burner 4a, 4b. Of course, the top plate 2 can have other shapes or openings of different design than shown in FIG. 1.

The layers, coating and manufacturing process of the component according to the invention is described in the following FIGS. 3 to 5 with regard to the top plate 2. The burner caps 6a, 6b shown in FIG. 2, may also have such a layers, coating and manufacturing process.

Figure 3:
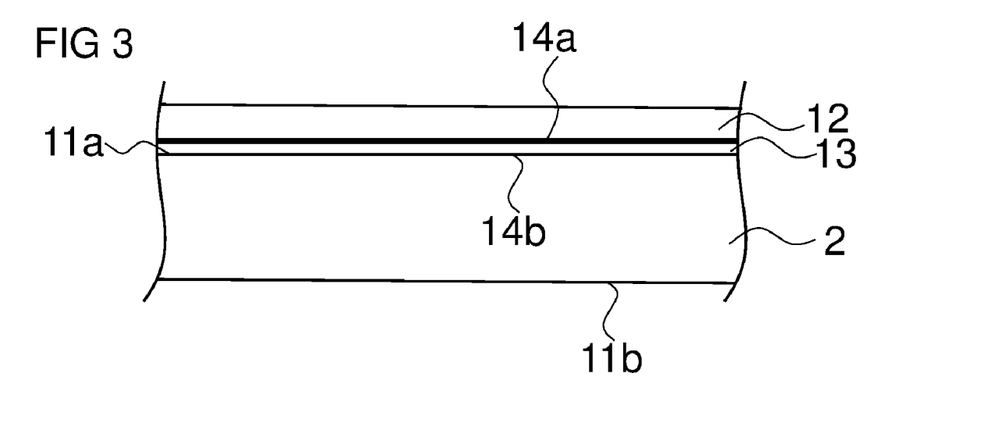
FIG. 3 illustrates a cross-sectional view of the top plate according to a first embodiment of the invention in detail.

FIG. 3 shows a cross-sectional view of the top plate 2 according to a first embodiment in which the layer structure can be seen. The top plate 2 is obtained by a process wherein the upper surface 11a of the top plate 2 is pretreated by an enameling process to form a ground layer 13 formed by a ground coat composition that has burned to the top plate 2 at temperatures of about 820° C. on said surface 7a. In general, the temperature for enameling a ground enamel may be between 680 and 820° C., depending of the specific formulation of the ground enamel. Said ground layer 13 or, respectively, enamel layer, has an upper surface 14a and a bottom surface 14b and shows a surface roughness Ra of about 2 to 3.5 µm at its upper surface 14a. The thickness of the ground layer 13 is about 20 µm. Ground layer 13 also shows corrosion resistant properties so that the top plate 2 is protected against corrosion, what is in particular useful and necessary if said top plate 2 is made of a corrosive material, for example a low carbon steel to save costs. Inventors have surprisingly found that such a small thickness and small roughness shows good adhesion properties that are sufficient for applying a non-stick and/or non-wetting coating 12 comprising at least one layer 17 that is obtained by a sol-gel process from a first composition comprising a silica sol and a silane and according to embodiments of the invention further components like solvents or additives in useful amounts as described before.

Figure 4:
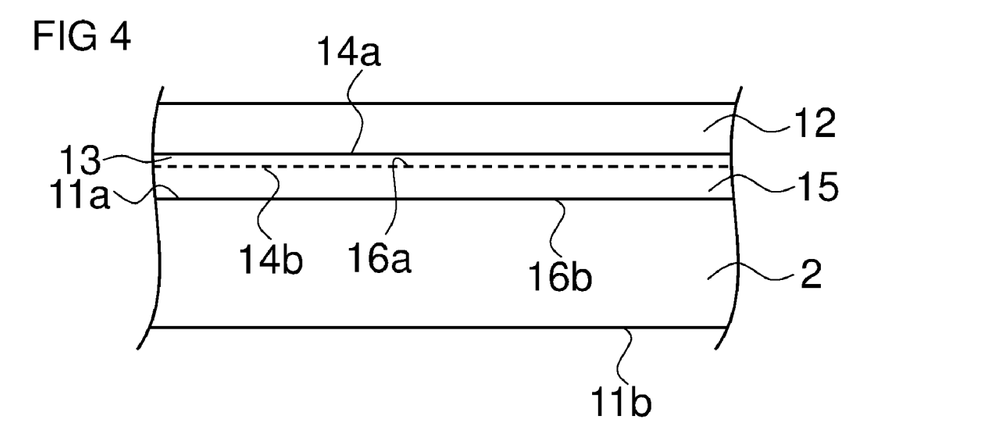
FIG. 4 illustrates a cross-sectional view of the top plate according to a second embodiment of the invention in detail.

FIG. 4 shows a cross-sectional view of the top plate 2 according to a second embodiment in which the layer structure can be seen. The top plate 2 is presently made from a corrosive material so that a protective layer 15 is applied to the upper surface 11a of the top plate 2 before the pretreatment step for preventing the top plate 2 from corrosion, the protective layer 15 having an upper surface 16a and a bottom surface 16b. Afterwards, for obtaining a top plate 2 with a non-stick and/or non-wetting coating 12, said protective layer 15 is pretreated by sandblasting or laser treatment to achieve a surface roughness of the surface 16a of the protective layer between about 2 and 3.5 µm by sandblasting or a surface roughness smaller than 1 µm by laser treatment. Inventors have surprisingly found out that even though the surface roughness achieved by laser treatment is smaller, good adhesion behaviour can be achieved, probably due to more fine-grained structure in comparison with a sandblasted surface. The protection layer 15 has a layer thickness of about 150 µm. In particular in case that the protection layer 15 is an aluminium layer or a layer comprising aluminium, it might be useful to carry out an enameling process to form a ground coat 13 on the surface 16a of the protective layer 15 (shown in dashed lines) to benefit from the good adhesive properties of an enamel layer made from a ground composition having a surface roughness between 2 to 3.5 µm.

Figure 5:
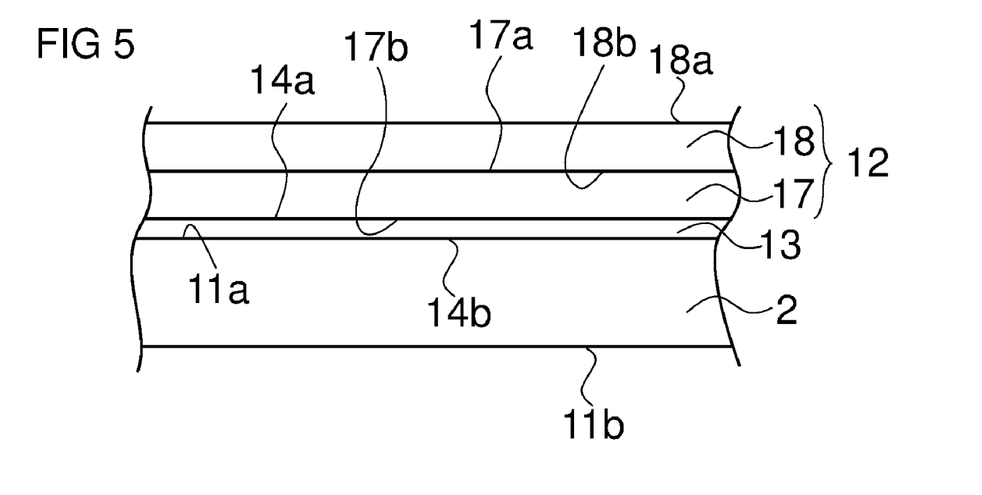
FIG. 5 illustrates a cross-sectional view of the coating according to an embodiment of the invention in detail.

FIG. 5 shows a cross-sectional view of the top plate 2 according to a third embodiment, that differs from the first embodiment according to FIG. 3 in that the non-stick and/or non-wetting coating 12 comprises a first and a second layer 17, 18, wherein the first layer 17 is applied to the surface 14a of the ground layer 13 and wherein the second layer 18 is applied to the first layer 17. The second layer 18 is obtained by a sol-gel process from a second composition comprising a silica sol, a silane and a siloxane.

As a matter of course, even a top plate 2 according to the second embodiment shown in FIG. 4 might have a non-stick and/or non-wetting coating 12 comprising a first and a second layer 17, 18, wherein the first layer 17 is applied to the surface 16a of the protective layer 15 and wherein the second layer 18 is applied to the first layer 17.

Both, the first layer 17 and, if present, the second layer 18 are obtained by a sol-gel process. For production of the first layer 17, a colloidal silica sol, which is pure $SiO_2$, an organoalkoxysilane, which is an organic-inorganic hybrid material and presently methyltrimethyoxysilane, and an acid catalyst, presently acetic acid are mixed and stirred for about 2 hours at room temperature in order to effect a condensation reaction. The weight proportion of organoalkoxysilane is about 10 to 40 wt %, silica sol is present in an amount of 30 to 70 wt %. Adding acetic acid in an amount of 0.1 to 2 wt % is sufficient for accelerating the condensation reaction.

Then, a solvent, presently propanol, is added in an amount of 10 to 40 wt %. Pigments are added and further additives can be additionally added at this step.

For production of the second layer 18, colloidal silica sol, siloxane and a solvent, even here propanol, are mixed. Organoalkoxysilane and an acid catalyst, presently acetic acid are then added. Even said mixture is mixed and stirred for about 2 hours at room temperature. The weight proportion of organoalkoxysilane is about 10 to 40 wt %, silica sol is present in an amount of 30 to 70 wt %, acetic acid is present in an amount of 0.1 to 2 wt %. Siloxane, presently polydimethylsiloxane, is added in an amount of 0.1 to 2 wt %.

Then, a solvent, presently even here propanol, is added in an amount of 10 to 40 wt %. Pigments are added and further additives can be additionally added at this step.

For manufacturing a top plate 2 having a non-stick and/or non-wetting coating 12 on its upper surface 11a, a top plate 2 having an upper surface 11a and a bottom surface 11b. In a further step, the upper surface 11a of the top plate 2 is pretreated in order to provide good adhesion properties and surface roughness for subsequent apply of the non-stick and/or non-wetting coating 12 (FIG. 3). Additionally or in an alternative, a protective layer 15 is applied to the upper surface 11a of the top plate 2 and said protective layer 15 is pretreated (FIG. 4). Pretreatment of the surface 7a of the top plate 2 or, if present, the surface 16a of the protective layer 15 is carried out in particular by sandblasting, laser treatment or an enameling process for forming a ground layer 13.

The enameling process is in particular carried out by applying an enamel powder onto the upper surface 11a of the top plate 2 and/or onto the surface 16a of the protective layer 15, and heating the enamel powder for providing a ground layer 13 with a surface 14a having a roughness being suitable for applying the non-stick and/or non-wetting coating 12.

Afterwards, at least one layer of the non-stick and/or non-wetting coating 12 is applied to the upper surface 11a of the top plate 2 or, if present, to the upper surface 16a of the protective layer 15 or the surface 14a of the ground layer 13.

In case of applying a non-stick and/or non-wetting coating 12 comprising at least two layers 17, 18 (FIG. 5), the first layer 17 is applied to the upper surface 11a of the top plate 2 or the surface 14a of the ground layer 13 or the surface 16a of the protective layer 15, and the second layer 18 is applied to the first layer 17. Both layers 17, 18 have a bottom surface 17a, 18a facing away from the top plate 2 and an upper surface 17b, 18b facing towards the top plate 2.

The present invention, thus a component, in particular top plate 2 having a non-stick and/or non-wetting coating 12 and a cooking appliance 1 having such a top plate 2 shows an improved cleaning behaviour. The coating 12 is abrasion-resistant and shows a greater surface hardness what leads to an increased lifetime. Furthermore, the coating 12 has shown a good adhesion properties on the top plate 2, in particular on the surface 14a of the ground layer 13 or the surface 16a of the protective layer 15. As the coating 12 is produced by a sol-gel process, a (second) burning step at high temperatures is not necessary.

The top plate 2 may further comprise a printing (not shown) that is applied, in particular by ink technology, to the surface of the coating 12, in particular to a surface area that has been activated by using plasma technology in order to increase the surface tension.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the apes pended claims.

LIST OF REFERENCE NUMERALS 1 gas hob
2 top plate 3 cooking area
4 control panel
5a, 5b gas burner
6a, 6b burner cap
7a, 7b burner crown
8a, 8b spark plug
9a, 9b thermocouple
10 control panel
11a upper surface of the top plate
11b bottom surface of the top plate
12 non-stick and/or non-wetting coating
13 ground layer
14a upper surface of the ground layer
14b bottom surface of the ground layer
15 protective layer
16a upper surface of the protective layer
16b bottom surface of the protective layer
17 first layer of the non-stick and/or non-wetting coating
17a upper surface of the first layer
17b bottom surface of the first layer
18 second layer of the non-stick and/or non-wetting coating
18a upper surface of the second layer
18b bottom surface of the second layer

The invention claimed is:

1. A method for manufacturing a coated top plate for a gas hob and/or a coated burner cap of a gas burner for a gas hob, comprising at least the following steps: providing a top plate and/or a burner cap having an upper surface and a lower surface, pretreating at least the upper surface of the top plate and/or burner cap by mechanical treatment, physical treatment or chemical treatment to form a ground layer having a surface roughness suitable for applying a non-stick and/or non-wetting coating, and applying at least one layer of the non-stick and/or non-wetting coating to a surface of the ground layer, performing an activation process using plasma technology on at least a part of a surface of the non-stick and/or non-wetting coating in order to provide an activated surface area, wherein the activation process increases surface tension within the activated surface area, and applying a printing to the activated surface area of the non-stick and/or non-wetting coating by means of ink technology, wherein the step of pretreating comprises applying a protective layer to the upper surface of the top plate and/or burner cap, applying an enamel powder onto the surface of the protective layer, and heating the enamel powder to provide said ground layer with the roughness suitable for applying the non-stick and/or non-wetting coating.

2. The method according to claim 1, wherein the step of pretreating comprises applying a protective layer comprising enamel and/or aluminium to at least the upper surface of the top plate and/or burner cap and pretreating a surface of the protective layer by sandblasting and/or laser treatment and/or an enamelling process to form the ground layer.

3. The method according to claim 2, wherein the step of pretreating comprises applying an enamel powder onto the surface of the protective layer, and heating the enamel powder to provide said ground layer with the roughness suitable for applying the non-stick and/or non-wetting coating.

4. The method according to claim 2, wherein the non-stick and/or non-wetting coating comprises a first layer and a second layer, wherein the first layer of the non-stick and/or non-wetting coating is applied to the surface of the ground layer, and wherein the second layer of the non-stick and/or non-wetting coating is applied to the first layer of the non-stick and/or non-wetting coating.

5. The method according to claim 4, wherein the first layer of the non-stick and/or non-wetting coating is obtained by a sol-gel process from a first composition comprising a silica sol and a silane.

6. The method according to claim 5, wherein the second layer of the non-stick and/or non-wetting coating is obtained by a sol-gel process from a second composition comprising a silica sol, a silane and a siloxane.

7. The method according to claim 6, wherein the siloxane is present in said second composition in an amount of 0.1 to 2 wt %.

8. The method according to claim 5, wherein the silica sol is present in an amount of 15 to 70 wt % and/or the silane is present in an amount of 2 to 70 wt % within the first composition.

9. The method according to claim 5, wherein the silane is an organoalkoxysilane and/or a fluoralkoxysilane.

10. The method according to claim 5, wherein the first composition comprises an organic solvent.

11. The method according to claim 10, wherein the organic solvent is present in said first composition in an amount of 10 to 60 wt %, and/or a catalyst is present in said first composition in an amount of 0.1 to 5 wt %.

12. The method according to claim 5, wherein the first composition comprises a siloxane.

13. The method according to claim 5, wherein the first composition comprises pigments and/or dyes and/or filling materials and/or further additives.

14. The method according to claim 2, wherein the protective layer has a thickness between 50 and 250 μm.

15. The method according to claim 1, wherein the top plate and/or burner cap comprises corrosive steel, stainless steel, glass, or glass ceramics.

16. The method according to claim 1, wherein: the ground layer is an enamel layer obtained by the enamelling process and has a layer thickness between 10 and 80 μm.

17. The method according to claim 1, wherein said surface of the ground layer has a surface roughness between Ra 0.01 μm to 10.00 μm.

18. The method according to claim 1, wherein:
the non-stick and/or non-wetting coating provides an activated surface area activated by an activation process that increases surface tension within the activated surface area, using plasma technology, and
a printing is applied to the activated surface area by means of ink technology.

19. The method according to claim 1, wherein:
the top plate and/or a burner cap is made of low-carbon steel, wherein the upper surface of the top plate and/or a burner cap is roughened by sand-blasting or by laser treatment to achieve a first surface roughness of Ra 0.01 μm to 10.00 μm according to ISO 4287:1997,
a protective layer is applied over the upper surface of the top plate and/or burner cap, said protective layer comprising a non-corrosive material selected from enamel and aluminum and having a thickness between 50 μm and 250 μm, said protective layer having an outer surface facing away from said top plate and/or burner cap,
the ground layer comprises enamel applied to said outer surface of said protective layer, the ground layer having an outer surface facing away from said protective layer that has a second surface roughness up to about 3.5 μm according to ISO 4287:1997 provided by sand-blasting or by laser treatment of the outer surface of said ground layer, the non-stick and/or non-wetting coating comprises a first non-stick, non-wetting solgel coating layer that is deposited on the outer surface of said ground layer, said first non-stick, non-wetting coating layer having been deposited as a first composition comprising 30 wt. % to 70 wt. % silica sol and 10 wt. % to 40 wt. % silane that underwent a first condensation reaction therebetween to yield the first non-stick, non-wetting solgel coating layer, the non-stick and/or non-wetting coating comprises a second non-stick, non-wetting solgel coating layer that is deposited on an outer surface of said first non-stick, non-wetting coating layer, said second non-stick, non-wetting coating layer having been deposited as a second composition comprising 30 wt. % to 70 wt. % silica sol, 10 wt. % to 40 wt. % silane, and 0.1 wt. % to 2 wt. % siloxane that underwent a second condensation reaction therebetween to yield the second non-stick, non-wetting solgel coating layer; said second non-stick, non-wetting solgel coating layer having an outer surface having an activated surface area that has been activated using plasma technology, and a printing is applied to the activated surface area by ink technology, said activated surface area having a water-contact angel of at least 95°.

* * * * *